A. F. LEWIS.
METHOD FOR MOLDING TILES.
APPLICATION FILED MAR. 22, 1916.
1,206,553.
Patented Nov. 28, 1916.
2 SHEETS—SHEET 1.
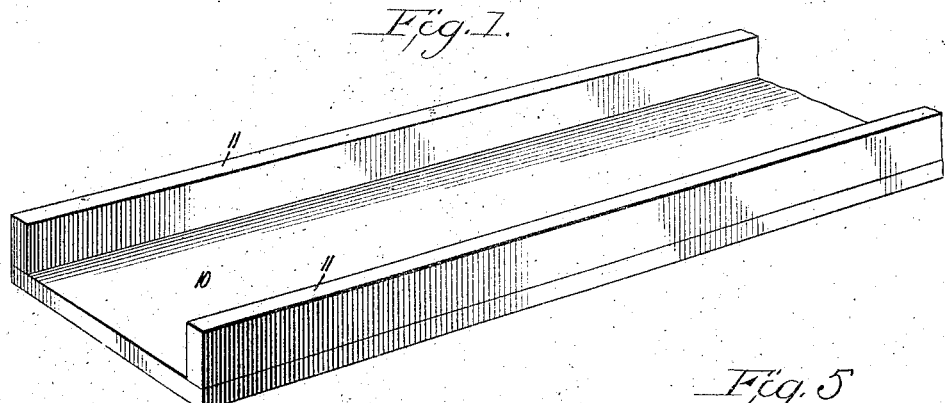
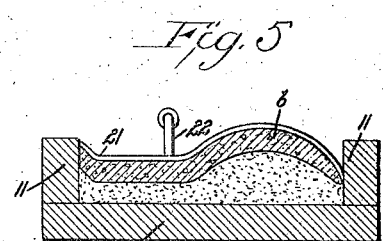
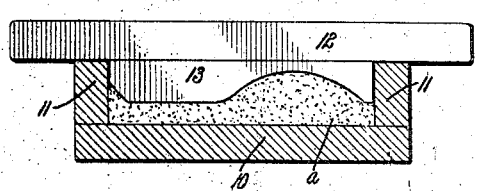
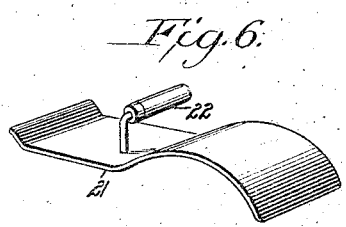
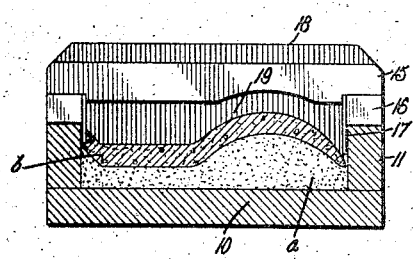
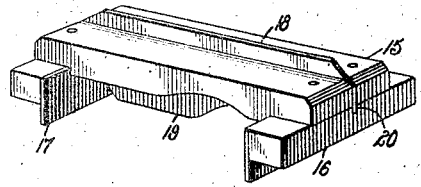
WITNESSES
INVENTOR
Anson F. Lewis
BY
ATTORNEYS A. F. LEWIS.
METHOD FOR MOLDING TILES.
APPLICATION FILED MAR. 22, 1916.
1,206,553.
Patented Nov. 28, 1916.
2 SHEETS—SHEET 2.
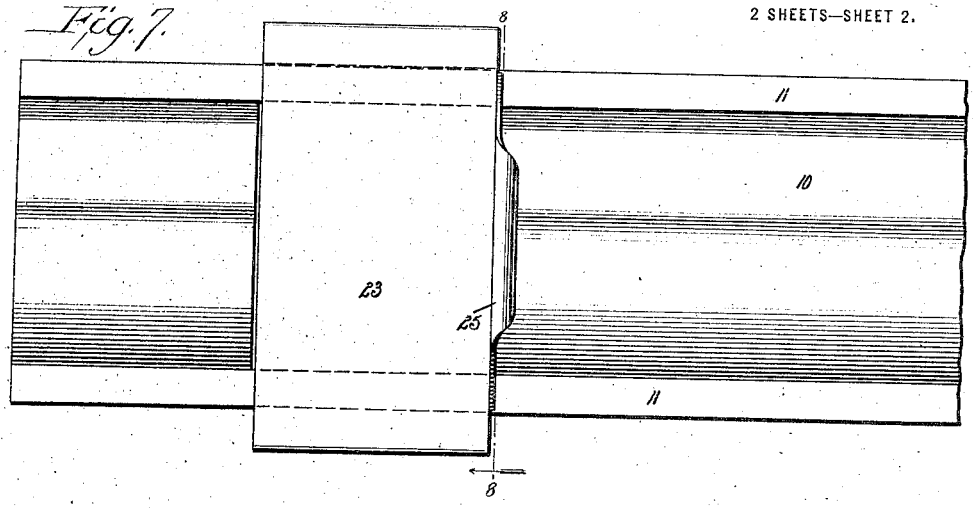
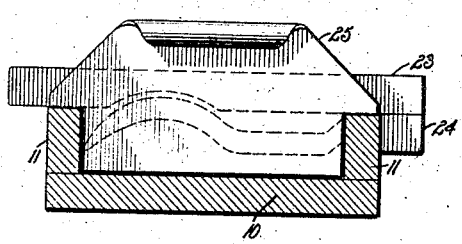
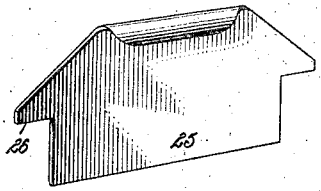
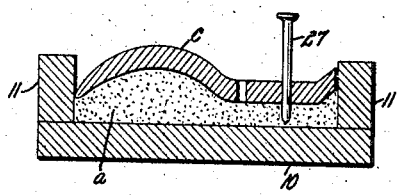
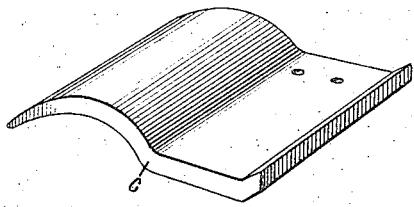
WITNESSES
INVENTOR
Anson F. Lewis
BY
ATTORNEYS

UNITED STATES PATENT OFFICE.

ANSON F. LEWIS, OF SANTA BARBARA, CALIFORNIA, ASSIGNOR OF ONE-HALF TO WILLIAM E. MOUCK, OF SANTA BARBARA, CALIFORNIA.

METHOD FOR MOLDING TILES.

1,206,553.     Specification of Letters Patent.    Patented Nov. 28, 1916.

Application filed March 22, 1916. Serial No. 85,887.

*To all whom it may concern:*

Be it known that I, ANSON F. LEWIS, a citizen of the United States, and resident of Santa Barbara, in the county of Santa Barbara and State of California, have invented a new and Improved Method for Molding Tiles, of which the following is a full, clear, and exact description.

My invention while useful for the making of roofing and siding tiles in general, is more particularly intended for the production of Spanish tile, mission tile, American-S, and tiles of similar shapes.

My invention has for its general object to provide a method and means whereby tiles may be produced with facility and with accuracy as to the desired shape, and whereby the finishing of the tile can be completed at once after the molding, and the tile maintained moist while curing, thereby doing away with the necessity of watering the tiles until after they have been removed from the molds.

The invention also has for an object to enable the workman to remove the tiles from the molds without any breakage, and to maintain the molds in a clean condition, thereby effecting a material saving of time and labor involved in the cleaning of the molds in making tiles by the usual method.

Other objects as well as the advantages of my invention will appear as the description proceeds.

Reference is to be had to the accompanying drawings forming a part of this specification in which similar reference characters indicate corresponding parts in all the views.

Figure 1 is a perspective view of a mold employed in carrying out my invention; Fig. 2 is a transverse vertical section of the mold with a bed of sand or equivalent absorbent material therein and showing in end view the bed-shaping scraper employed in forming the bed surface in conformity with the inner side of the tile to be produced; Fig. 3 is a view similar to Fig. 2 with the cement mixture in place on the absorbent bed and showing in end view the cement-shaping scraper for giving the desired formation to the face or outer surface of the poured cement in accordance with the profile of the tiles to be produced; Fig. 4 is a perspective view of the cement-shaping scraper shown in Fig. 3; Fig. 5 is a cross section showing the third instrumentality for giving a trowel finish to the cement after the shaping by the scraper shown in Figs. 3 and 4; Fig. 6 is a perspective view of the surfacing device shown in Fig. 5; Fig. 7 is a plan view showing the gage and cutter employed for cutting the molded cement into tiles of the desired length; Fig. 8 is a cross section on the line 8—8, Fig. 7; Fig. 9 is a perspective view of the cutter shown in Figs. 7 and 8; Fig. 10 is a cross section showing the manner of punching the nail holes in the tile; Fig. 11 is a perspective view of the finished tile.

In carrying out my invention, an elongated mold 10 is employed presenting a flat bottom and upright side rails 11, the width between the rails corresponding with the size of the tile.

In accordance with my invention a bed of sand $a$ is placed in the mold 10, or any equivalent granular material serving to absorb moisture and retain the same in the manner of sand. The bed $a$ having been laid, a bed shaper 12 is employed having a block 13 at the under side thereof of a width to enter snugly between the side rails 11 of the mold 10 so that the said sides will constitute a track on which the shaper may travel, the fit between the said rails serving to insure a parallel movement of the shaper over the bed. The under surface of the block 13 is given a conformation corresponding with the inner surface of the tile to be produced. The bed $a$ having been shaped by the device shown in Fig. 2, the cement mixture $b$ is poured onto the bed to cover the bed in the form of a continuous layer for substantially the whole length of the mold 10. A second scraper for shaping the cement surface is now employed as shown in Figs. 3 and 4, and designated generally by the numeral 15. The said shaper 15 has side blocks 16 to run on the track rails 11, and at the inside of said blocks 16, guide plates 17 are provided extending below the blocks and adapted to fit against the inner surfaces of the track rails 11 to insure parallel movement of the shaper 15 as it is moved along the tracks. A scraper blade 18 is fitted transversely in the shaper 15, and its lower portion 19 is given a width to extend between the plates 17. The lower edge of the blade has a profile corresponding with the configuration of the tile on the outer surface. A transverse slot 20 in the shaper 15 accommodates the blade 18.

The blade may be replaced by one having a different profile to conform to a tile of different shape.

If coloring material is to be employed, it is applied after the surface shaping of the cement, and may be spread by the shaper 15. Following the use of the shaper 15, a trowel finish is given to the cement by means of a trowel 21 having a shape corresponding with the tile surface. Said trowel has a suitable handle 22. The cement layer having thus been shaped and surface finished, the devices shown in Figs. 7 to 9 are employed including a gage consisting of a transverse board or slab 23 provided with a guide member or members, there being shown a guide strip 24 at one end of the board 23 at the under side adapted to engage the outer side wall of a track 11 to insure parallel movement of the gage on the mold. In connection with the gage 23, a cutter 25 is employed consisting of a flat blade having lateral overhanging shoulders 26 adapted to rest on the track rails 11 with the blade flat against the side edge of the gage 23. The gage determines the length of the tile and a vertical movement of the cutter through the shaped and finished cement serves to sever the same into tiles of the proper length. Nail holes are now punched in the tiles c by any suitable means, there being indicated in Fig. 10, a punch 27 for the purpose.

An important result is obtained by the use of sand in that the bed takes up the moisture in the cement mixture thereby enabling the finishing of the tile at once, including the cutting and punching. Also, by carrying out the successive steps in the making of the tile while the cement and the finished tile are on the absorbent bed of sand, or equivalent material, the bed enables the workman to accurately sever the cement without distorting the tile and similarly enables the workman to do the punching without distortion of the tile, both the cutter and the punch readily penetrating the sand bed without disturbing the tiles on the firm bed. The bed of sand maintains the tiles in a proper moist condition while curing and thus does away with the watering of the tiles while curing as is required to be done in making tiles by ordinary methods. Moreover, the nature of the sand bed enables the workman to readily remove the tiles from the mold without danger of breakage. Furthermore, the molds are always clean and the time and labor involved in the cleaning of ordinary molds are thus saved.

It is to be understood that the term cement as employed herein is in a broad sense and is inclusive of all other equivalent moldable materials from which tiles of the character referred to are made.

Having thus described my invention I claim as new, and desire to secure by Letters Patent:

1. The method of making tiles, which consists in forming a bed of absorbent granular material in a mold, shaping the surface of the said bed to conform to the inner surface of the tile to be produced, forming a continuous layer of cement in the mold directly on said shaped bed, shaping the surface of the cement layer while on the bed, to correspond with the profile of the tile to be produced, severing the layer while on the bed into tiles by passing a cutter downward through the said layer and into the said bed, punching the tile while on the bed, permitting the tiles to cure on the bed, then removing the cured tiles from the bed.

2. The method of making tiles, which consists in forming in a mold a longitudinal continuous bed of sand or the like, of a character to be penetrated by a knife, shaping the surface of the bed to conform to the inner surface of the tiles to be produced, forming and shaping a continuous layer of cement in the mold directly on the said shaped bed, then severing the said layer into separate tiles on the said bed.

3. The method of making tiles, which consists in forming in a mold, a longitudinal continuous bed of sand or the like, penetrable by a knife, shaping the surface of the bed to conform to the inner surface of the tiles to be produced, forming and shaping a continuous layer of cement in the mold directly on the said shaped bed, severing the said layer into separate tiles on said bed by forcing a cutter downwardly therethrough to the said bed, finishing said tiles, permitting the said separated tiles to remain on said bed for curing, then removing the cured tiles from the bed.

4. The method of making tiles, which consists in forming in a mold a longitudinal continuous bed of sand or the like, of a character to be penetrated by a knife, shaping the surface of the bed to conform to the inner surface of the tiles to be produced, forming and shaping a continuous layer of cement in the mold directly on the said shaped bed, severing the said layer into separate tiles on the said bed, then finishing said tiles on said bed.

In testimony whereof I have signed my name to this specification in the presence of two subscribing witnesses.

ANSON F. LEWIS.

Witnesses:
FLORA KELCH,
B. F. THOMAS.